April 4, 1950 — L. B. HARRIS — 2,503,109
ANTENNA ASSEMBLY
Filed Nov. 6, 1946 — 3 Sheets-Sheet 1

INVENTOR.
Lewis B. Harris
BY Charles S. Wilson
ATTORNEY.

April 4, 1950 L. B. HARRIS 2,503,109
ANTENNA ASSEMBLY
Filed Nov. 6, 1946 3 Sheets-Sheet 2
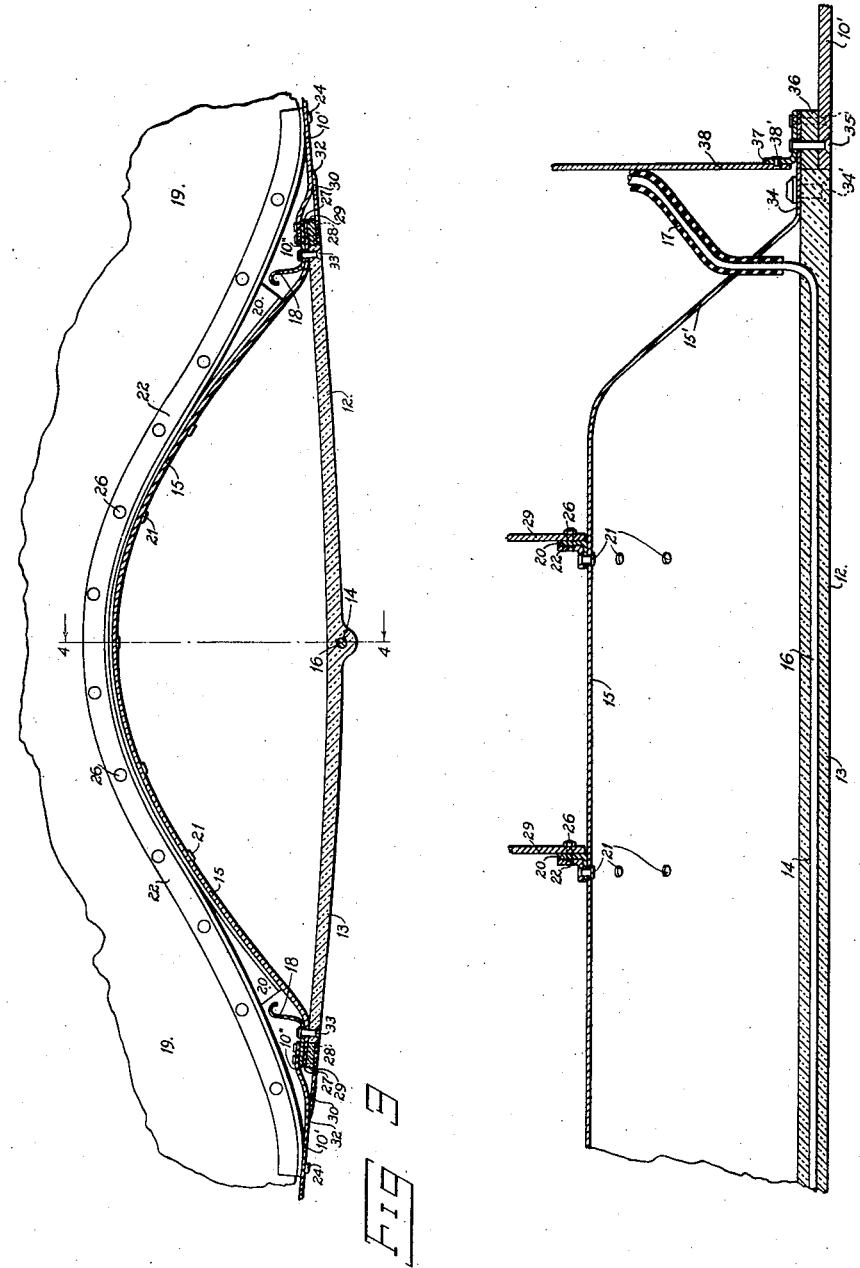
INVENTOR.
Lewis B. Harris
BY Charles S. Wilson
ATTORNEY.

April 4, 1950     L. B. HARRIS     2,503,109
ANTENNA ASSEMBLY
Filed Nov. 6, 1946     3 Sheets-Sheet 3
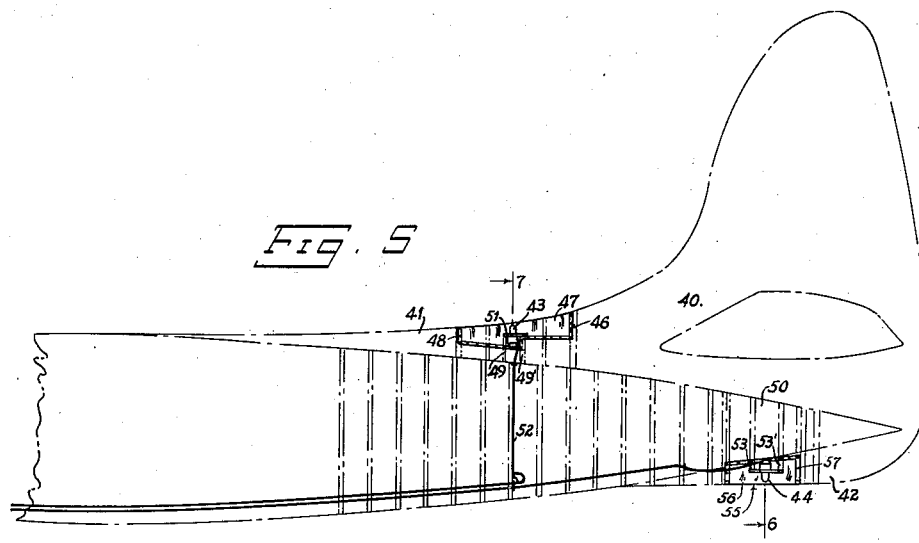
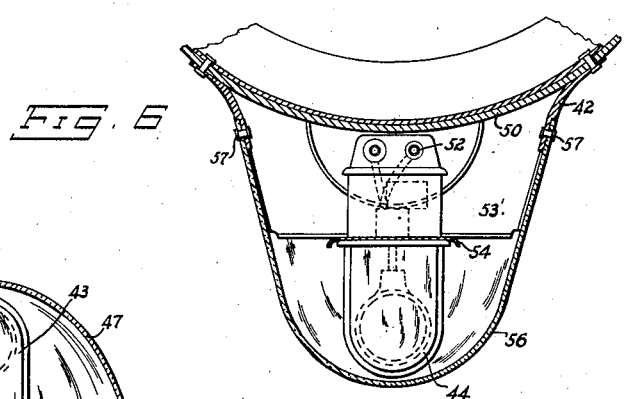
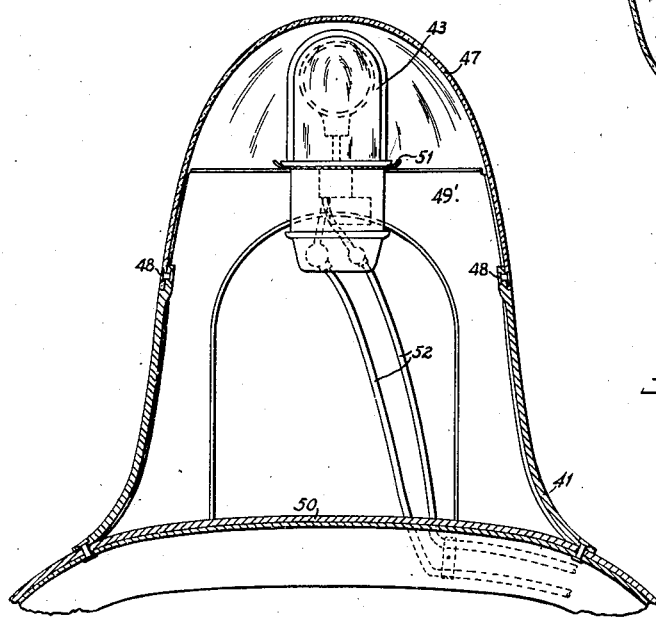
INVENTOR.
Lewis B. Harris
BY Charles S. Wilson
ATTORNEY.

Patented Apr. 4, 1950

2,503,109

UNITED STATES PATENT OFFICE 2,503,109

ANTENNA ASSEMBLY

Lewis B. Harris, Nassau Shores, N. Y., assignor to Republic Aviation Corporation, Farmingdale, N. Y., a corporation of Delaware Application November 6, 1946, Serial No. 708,049

5 Claims. (Cl. 244—129)

This invention relates to vehicular radio antennas for the transmission and reception of radio signals and proposes means for a mounting antenna in or substantially in the metallic or non-metallic skin or covering of a vehicle whereby operating efficiences comparable to conventional vehicular antennas are obtained.

In modern high-speed aircraft, present methods of mounting antennas outside of the fuselage or wing structures introduce sufficient added wind resistance or drag to materially reduce the maximum speed otherwise obtainable. These conventional antennas may consist of a flexible wire supported between one of the tail fins and the wing or it may be a rod or loop mounted on and projecting from the skin. In either event, sufficient interference with the flow of air over the airfoil surfaces during flight is experienced to disturb the aerodynamic stability and materially decrease the maximum attainable speed.

It is therefore proposed to install an antenna in or approximately in the skin of the aircraft or other vehicle to the end that these objectionable discontinuities or irregularities in the surface contour of the aircraft components will be avoided and at the same time providing an antenna supporting structure that will permit the realization of high antenna operating efficiencies.

The instant invention contemplates a supporting structure or housing for an antenna which will, for all practical purposes, comprise a part and continuation of the adjoining external surface of the aircraft and in at least one adaptation thereof the antenna per se is housed within or forms a part of this supporting structure or panel.

With the above and other objects in view, as will be apparent, this invention consists in the construction, combination, and arrangement of parts, all as hereinafter more fully described, claimed and illustrated in the accompanying drawings, wherein:

Fig. 3 is a transverse section through the recessed antenna taken along the line 3—3 of Fig. 2;

Fig. 4 is a vertical longitudinal section taken along the line 4—4 of Fig. 3;

Fig. 5 is a side elevation of the empennage of an aircraft showing loop antennas installed in the dorsal and ventral fins thereof;

Fig. 6 is a section along the line 6—6 of Fig. 5 to illustrate the installation of a loop antenna in the ventral fin according to this invention; and Fig. 7 is a section along the line 7—7 of Fig. 5 to show the installation of a loop antenna in the dorsal fin.

Figure 1:
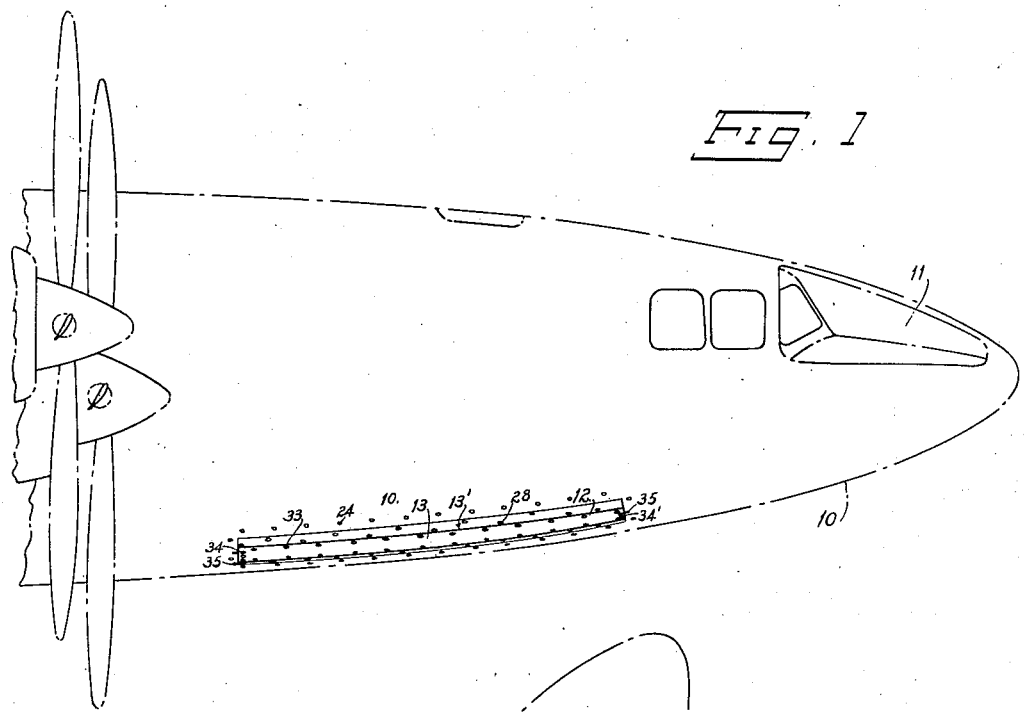
Fig. 1 is a side elevation of that section of an aircraft fuselage forward of the wings showing an antenna recessed in the surface thereof in accordance with the present invention.

With the development of radio navigational aids, the antenna requirements for aircraft have gradually increased to the point that the resistance or drag of an aircraft antenna system, in view of present speeds, has become not only appreciable but constitutes a serious handicap to the operation and flight of the plane.

To overcome this it is proposed to provide a recessed antenna mount for aircraft that will conform with the surface contour thereof and provide antenna operating efficiences comparable to that of a conventional or projecting antenna.

In one form of the invention, the antenna may be embedded in a dialectric panel, or may be mounted on or secured to the inner surface of such panel, which is substituted for a section of the usual metallic or non-metallic skin of the aircraft. Since the dielectric panel is an insulator which will permit electromagnetic waves to pass freely therethrough, the antenna will function as if suspended in an opening in the skin of the aircraft without the panel. Behind the antenna and dielectric panel is placed a metallic shield or reflector in much the same way and for somewhat the same purpose as a reflector is used in connection with a light source. In the transmission of radio signals a reflector will direct a substantial portion of the radio waves in a predetermined beam away from the aircraft which obviously results in an improved transmitting efficiency since only a small percentage of the radiations will be absorbed by the reflector. In the case of the receiving antenna the reverse effect will take place to increase the receiving efficiency because a greater portion of the arriving radio waves will be interrupted by the reflector and directed generally toward the antenna. Furthermore the reflector provides a means whereby the capacity of the antenna to ground (the reflector being considered to be at ground potential) can be easily determined and adjusted for maximum operating efficiency.

Referring to the drawings, 10 denotes that nose of an aircraft fuselage having a pilot's compartment 11. On the under side of the fuselage 10 are mounted two antenna assemblies 12 and 12′, each being generally rectangular in shape and tapered forwardly, if necessary, to conform with the external contour of the fuselage. Although these antenna assemblies 12 and 12′ are disposed on the forward section of the nose 10, it is to be understood that they may be located in any desired portion of the fuselage, wing or empennage depending entirely upon the design of the aircraft and/or the purpose of the antennas. In the present instance the antennas are used to receive signals from ground radio stations located generally on the path of travel of the aircraft and have, therefore, been placed as far forward on the fuselage as its internal structure would allow and on its under side to intercept with greater efficiency signals transmitted by the ground stations.

The antenna assemblies 12 and 12′ are identical in structure and each consists generally of a panel of dielectric material 13 having a centrally located longitudinal passage 14 for the reception and support the antenna 16 (here shown as a wire) and a metallic shield or reflector 15 of arcuate cross-section and a length commensurate with that of the dielectric. The dimensions of the antenna assembly are governed by the length of the antenna 16 to be supported within the passage 14 and the size of the reflector 15, the physical size and shape of the latter being determined by the required capacity of the antenna to the ground (the reflector again being considered to be at ground potential).

By way of amplification, the length of a simple antenna, such as the single wire end-fed antenna 16 illustrated, is governed by the radio frequency at which it is to operate and actually varies inversely as the frequency. With the length of the antenna determined, it must be matched to the radio receiver with which it is to cooperate to afford the maximum transfer of received signal power to the receiver. Assuming that the input characteristics (inductance and capacitance) of the receiver are fixed, the capacity (nearness) of the antenna to ground is the only remaining variable. Since the power transfer efficiency is a function of the combined inductance and capacitance of the antenna and receiver input circuit and since the inductance and capacitance of the receiver are known, the required antenna capacitance for maximum efficiency can be determined and the shield or reflector made of a size and shape that will provide this determined value of capacitance.

With the dimensions of the antenna assembly determined, an opening 13′ having a length and width corresponding to the computed size of the dielectric panel 13 is formed in the skin 10′ of the fuselage, and the internal fuselage structure is altered to provide sufficient space to permit insertion and mounting of the reflector 15. As here illustrated, the openings 13′ are formed in the skin of the fuselage between a pair of longitudinal members or stringers 18 which normally form part of the fuselage structure or may be added to reinforce the edges of the opening 13′. These stringers 18 are secured to the transverse bulkheads or ribs 19 by suitable slots or openings in the several bulkheads or ribs shaped to receive, engage and permit the passage of said stringers. In addition to the opening 13′ provided in the skin 10′ a section of each of the bulkheads or ribs 19 spanned or traversed by the antenna 16 is removed to provide sufficient clearance for the mounting of the reflector 15 within the fuselage when it and the dielectric panel 13 are positioned in the opening 13′ and secured to the skin 10′.

A series of angle brackets or stiffening members 20 formed to the contour of the reflector 15 are secured thereto by a series of rivets or other suitable fastening means 21, the relative positions of these brackets on the reflector being such that each bracket may be subsequently secured to one of the spanned or traversed bulkheads or ribs 19. Oevrlapping and resting with each bracet or stiffening member 20 is an angle bar 22 curved or shaped to follow the contour of the central section of the reflector 15 and bent generally away from the reflector at its ends to clear the stringers 18 and meet the skin 10′ tangentially for attachment thereto by any suitable means, such as the rivets 24. A series of bolts or other attaching means 26 pass through the brackets 20 and bars 22 to secure them to the bulkheads or ribs 19 and the rivets 21 not only attach the brackets 20 to the reflector 15 but also the angle bars 22.

The flanges or extensions 27 on the longitudinal edges of the reflector 15 are secured to depressed edge portions 10″ of the skin 10′ by a series of rivets 28 piercing the edge portions 10″, the stringers 18 and the flange 27. To so cover the depressed edge portions 10″ of the skin 10′, as well as the joints between the flanges 27 and the skin, that a relatively smooth, unbroken external surface is presented where the panel 13 joins the skin, a spacer 29 is secured to the outer face of each flange 27 by the rivets 28, upon which is mounted a finishing strip 30, also held in place by the rivets 28. This strip 30 is positioned by the spacer 29 in the plane of the exposed face of the panel 13 and the body of the strip in effect comprises an extension or continuation of said exposed face which terminates substantially flush with and is welded to the outer face of the skin 10′ as at 32.

With the reflector 15 secured to the fuselage as aforesaid, the panel 13 is placed over or within the opening 13′ and is held in position by rivets or other fastening means 33 passing through the panel 13, the edge flange 27 of the reflector 15 and the longitudinal stringers 18. Each end 15′ of the reflector 15 (Fig. 4) is bent outwardly to meet the panel 13 where it terminates in a flange 34 resting flush against the inner surface of the panel and is fastened by the rivets 34′. This flange 34 also extends beyond the edge of the panel to overlie the skin 10′ where it is secured by the rivets 35 passing through the skin 10′ and a spacer 36 interposed between the flange 34 and the skin. An angular bracket 37 is riveted, as at 38′, to the bulkhead 38 adjoining the end of the reflector 15 and rests over the surface of the spacer 36 opposed to the skin 10′ where it is secured by the rivets 35 to clamp the flange 34 between it and said spacer.

Although the antenna herein described is of the end-fed type; that is, an antenna in which the connection 17 for conducting the received signals to the radio receiver is made at one end thereof, it is apparent that other types of antennas such as center-fed and doublets may also be employed with equal facility. Furthermore, the antenna wire 16 is not to be strictly limited to one of circular cross section, but may actually consist of a strip of metal or a suitable metal channel supported by or encased in the panel 13.

A modified form of the invention is shown in Figs. 5, 6 and 7 wherein loop antennas for direction finding purposes are incorporated within the tail fins of an aircraft at or adjoining the skin thereof. In these views 40 denotes the empennage of the fuselage of an aircraft, having a dorsal fin 41 and a ventral fin 42 in which loop antennas 43 and 44 are respectively mounted.

For housing the antenna 43 in the dorsal fin 41, a section 46 of the metallic skin of the fin is removed to be replaced by a dielectric panel 47 formed to substantially the same shape as the removed section 46 of the fin. The panel 47 is shaped to constitute a continuation of the contour of the fin 41 and at its edges overlaps the edges of the opening resulting from the removal of the section 46 as shown in Fig. 5 whereby the metal body of the fin 41 may be secured to the panel 47 by suitable attaching means, such as rivets 48. Within the dorsal fin 41 and projecting into the space defined by the panel or dome 47 are two brackets or supporting ribs 49 and 49' mounted on and fastened to the fuselage 50 which carry and support a channel plate 51 for mounting the loop antenna 43. Cables or other conductors 52 connected to the antenna 43 and passing through the fuselage 50 connect the loop antenna to the radio apparatus (not shown) and provide the necessary electric circuits for the rotation thereof.

The mounting structure for the loop antenna 44 in the ventral fin 42 (Fig. 6) is substantially the same as that employed in mounting the antenna 43 in the dorsal fin 41. The brackets or supporting ribs 53 and 53' are mounted under and secured to the fuselage 50 to carry and support the channel plate 54 on which the antenna 44 is mounted. Here again, the opening 55 resulting from the removal of a section of the fin 42 is closed by a dielectric panel or dome 56 overlapping and fastened to the skin of the fin 42 by rivets or other suitable fastening means 57.

Figure 2:
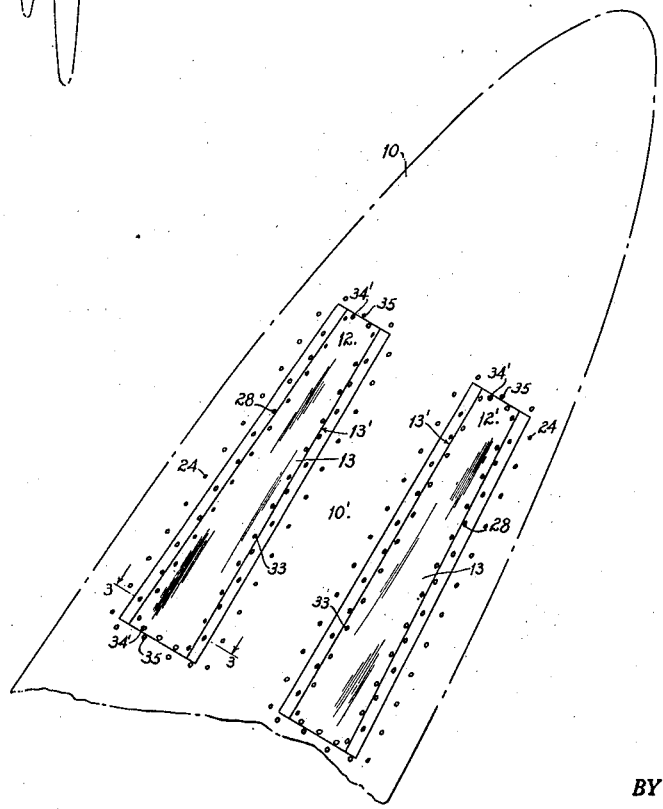
Fig. 2 is a bottom view of the forward section of the fuselage illustrated in Fig. 1 showing two antennas mounted thereon as taught by this invention.

It will be observed that, while those forms of the invention illustrated in Figs. 5, 6 and 7 employ a totally different type of antenna from that used in the form hereof shown in Figs. 1 to 4 inc., in all forms of the invention the antenna is housed or covered by a dielectric panel, opaque, transparent or transluscent, which comprises a part and continuation of the associated skin of the aircraft and that in each instance the antenna is situated in close proximity to or within this panel. This arrangement greatly improves reception without projecting any structural part into the air stream other than the usual and normal structural components of the airframe.

What is claimed is:

1. The combination with an aircraft having an opening in its skin, of an antenna assembly confined by said opening comprising a concave shield within the aircraft at said opening, having an integral flange about the entire edge thereof overlying the edge portions of the skin of the aircraft adjacent said opening, means for attaching said overlapping flange to the skin, a plurality of stiffening members fastened to said shield and to the internal structure of the aircraft, a panel of dielectric material closing said opening and fastened to the flange of said shield to rest flush with the exposed surface of the skin, and an antenna supported by and extending through the length of said panel centrally of its width.

2. The combination with an aircraft fuselage having an opening in its skin, of an antenna assembly within the fuselage at said opening, comprising a relatively long narrow metal channel concave in cross-section and having closed ends, a flange integral with and extending outwardly from each edge of said channel to be secured to the inner surface of the aircraft skin adjacent said opening, transverse structural members attached to said channel having outwardly extending end portions terminating in the plane of and attached to the skin beyond the flanges of channel and embodying upwardly extending flanges for attachment to the internal fuselage structure, a non-metallic panel having a central longitudinal passage therein, said panel being coextensive with said opening and constituting a continuation of the skin of the fuselage, means including the flanges of the channel for holding said panel within the opening aforesaid, and an antenna housed within and coextensive with said passage.

3. The combination with an aircraft component including a series of parallel spaced structural members and a skin enclosing said structural members, the skin having a relatively long, narrow opening therein and the structural members in alignment with said skin opening each having an arcuate opening therein extending inwardly from the skin opening and the edge portions of the skin defining the longitudinal sides of the opening being depressed inwardly, of an antenna assembly associated with said opening in the skin of the aircraft component comprising a metallic shield, concave in cross-section, seated in the arcuate openings of the structural members and terminating at its edges in outstanding flanges, curved stiffening members attached to said shield centrally of their length and attached throughout their length to the structural members of the aircraft component adjacent to the arcuate openings therein, a dielectric member positioned in the aforesaid opening in the skin with its outer surface forming a substantial continuation of the outer surface of the skin, said dielectric member having a central longitudinal passage extending throughout its length, means whereby the edge portions of the dielectric member may be attached to the depressed edge portions of the skin, additional means whereby the edge portions of the dielectric members may be attached to the aforesaid structural members of the component, a finishing strip attached to the outer surface of the dielectric member to form a continuation of its outer surface and to rest flush over and against the outer surface of the skin of the component adjacent to the junction between the skin and the depressed edge portions thereof, and an antenna housed within and coextensive with the passage of the dielectric member.

4. The combination with an aircraft component consisting of a series of spaced, parallel bulkheads and a skin associated with and surrounding said bulkheads, said skin having a relatively long narrow opening therein traversing at least two of said bulkheads, the bulkheads traversed by said opening having recesses therein extending inwardly from said opening and the skin at the longitudinal sides of said opening being depressed inwardly, of a shield, concave in cross-section and having outstanding flanges at its edges, seated in the recesses in the bulkheads and enclosing said skin opening, stiffening members mounted on and connected, medially of their lengths, to said shield, and connected throughout their lengths to the bulkheads and at their ends to the skin, means whereby the depressed longitudinal edges of the skin overly and are secured to the flanges at the longitudinal sides of the shield, means whereby the flanges at the transverse ends of the shield overlie and are secured to the adjacent edges of the skin, a dielectric panel positioned to completely fill the opening in the skin and having a longitudinal passage situated therein centrally of its width, means whereby the longitudinal edges of the dielectric panel are secured to the bulkheads and to the flanges at the longitudinal sides of the shield, means whereby the transverse ends of the dielectric panel overlie and are attached to the skin and to the end flanges of the shield, and an antenna coextensive with and housed within the passage of the panel aforesaid.

5. In an aircraft having a skin and an opening in said skin, the combination with a concave reflector within the aircraft and enclosing said opening, of a rectangular, unitary panel of dielectric material situated in and completely closing said opening with its outer surface forming a flush continuation of the aircraft skin, and an antenna imbedded in, and completely surrounded by the material of, said panel centrally of its width and substantially coextensive with the length of said panel thereby occupying a fixed position relative to the reflector.

LEWIS B. HARRIS.

REFERENCES CITED

The following references are of record in the file of this patent:

UNITED STATES PATENTS

| Number | Name | Date |
|---|---|---|
| 2,197,601 | Wolaver | Apr. 16, 1940 |
| 2,242,200 | Woods | May 13, 1941 |
| 2,368,663 | Kandoian | Feb. 6, 1945 |
| 2,418,084 | Montgomery | Mar. 25, 1947 |
| 2,431,124 | Kees et al. | Nov. 18, 1947 |